July 21, 1931. S. J. BOUGHTON 1,815,034
TRANSMISSION
Filed April 13, 1929 3 Sheets-Sheet 1
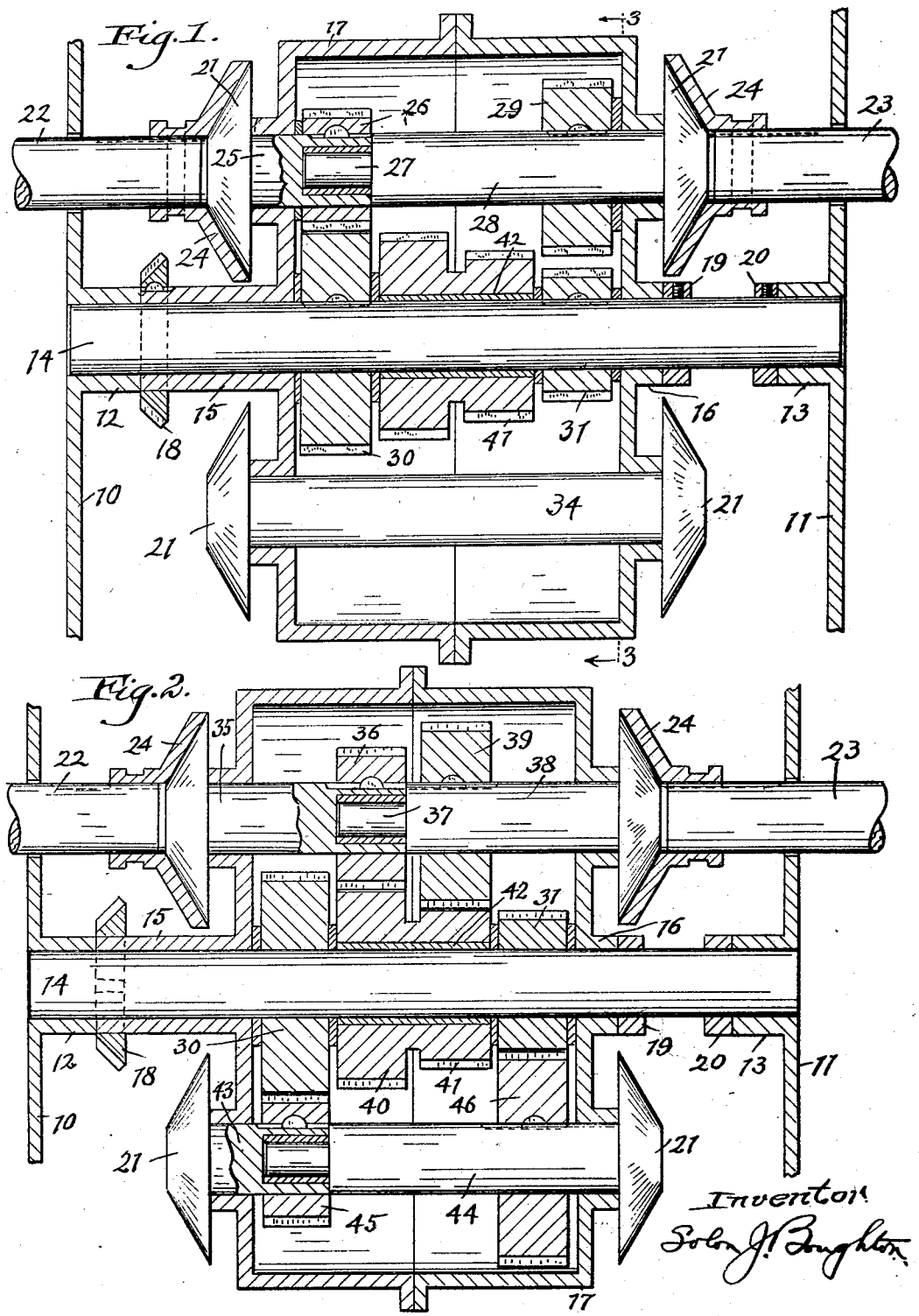
Inventor
Solon J. Boughton July 21, 1931.  S. J. BOUGHTON  1,815,034
TRANSMISSION
Filed April 13, 1929   3 Sheets-Sheet 3

Inventor:
Solon J. Boughton

Patented July 21, 1931

1,815,034

UNITED STATES PATENT OFFICE

SOLON J. BOUGHTON, OF SHAKER HEIGHTS, OHIO

TRANSMISSION

Application filed April 13, 1929. Serial No. 354,773.

This invention relates to improvements in transmissions, being intended primarily for use in automotive vehicles. The invention in some of its aspects is in the nature of an improvement over those of my copending applications Serial Nos. 313,450 and 326,639, filed October 19, 1928, and December 17, 1928, respectively.

One of the objects of the invention is the provision of a plurality of independent transmission units, any one of which may be brought into operative or driving position, the various elements of each transmission unit remaining constantly in operative relation, thereby permitting speed changes without any possible clashing of gears.

Another object is the provision of a carrier for the various transmission units which shall be rotatable about an axis parallel to the driving and driven shafts in order to bring any one of the units selectively into power transmitting position.

A further object of the invention is to so arrange the gear trains of the various units that they may have a common jack shaft, the axis of which is coincident with the axis of the carrier trunnions.

Other objects and features of novelty will appear as I proceed with the description of those embodiments of the invention which, for the purposes of the present application, I have illustrated in the accompanying drawings, in which:

Fig. 1 is a sectional view of an automobile transmission embodying the invention, the section being taken through the trunnions of the gear carrier and through the coupling portions of two of the transmission units.

Fig. 2 is a view similar to Fig. 1 with the gear carrier turned through an angle of 90°.

Figure 3:
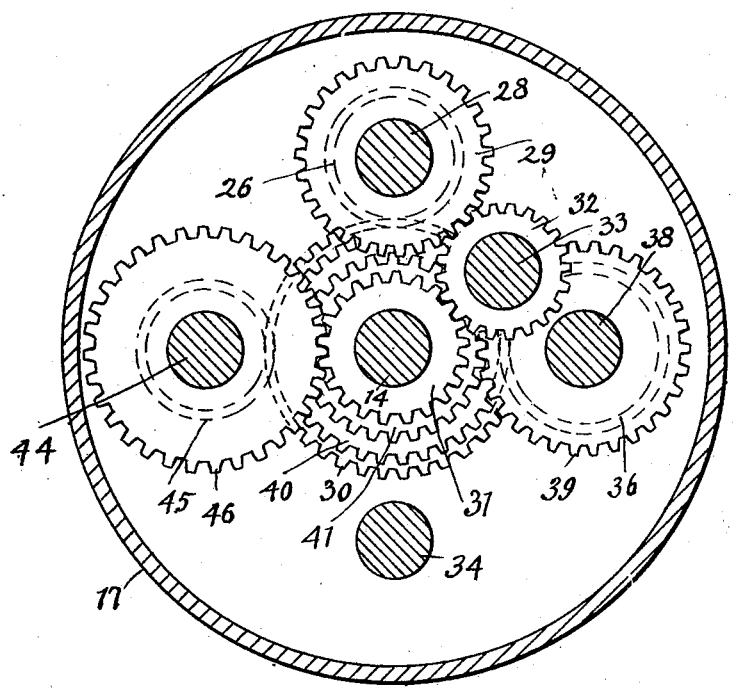
Fig. 3 is a cross sectional view taken substantially on the line 3—3 of Fig. 1.

In the drawings, 10 and 11 represent frame members of any suitable or convenient form, fixed to the chassis of an automotive vehicle, these members having bearings 12 and 13, respectively, in which are mounted for rotation a shaft 14. This shaft constitutes an internal supporting bearing for the hollow trunnions 15 and 16 of a gear carrier 17 which, in the present instance, takes the form of an oil-tight housing entirely enclosing the gearing. On the end of the trunnion 15 there is a bevel gear 18 which is adapted to be turned by any suitable means to alter the angular position of the gear carrier. Collars 19 and 20, secured to the shaft 14 by means of set screws, may be employed in order to prevent longitudinal movement both of the shaft 14 and of the gear carrier 17.

In the gear carrier 17 I mount a series of transmission units adapted to transmit power at different speeds, each one of these units comprising a pair of coupling members, preferably clutch cones 21. The rotation of the carrier 17 through a proper angle serves to bring any one of the various pairs of clutch cones 21 into power transmitting position.

The power shaft of the vehicle is represented at 22, and the propeller shaft or other driven shaft at 23. On each of these shafts there is a female cone clutch member 24 slidably keyed to the shafts 22 and 23 respectively. It is intended that these female clutch members be moved simultaneously outwardly or inwardly by any suitable means, such, for instance, as that illustrated in my copending application Serial No. 326,639. When they are in engagement with one of the various pairs of clutch cones 21, power is transmitted from the shaft 22 to the shaft 23, through the transmission unit which is in operative position at the time.

As illustrated herein there are four such units. In Fig. 1 the reverse gear unit is shown in driving position. It comprises a short shaft 25 having a gear 24 fixed thereupon, and bored out concentrically to provide a bearing for a constricted end portion 27 of a shaft 28 aligned with the shaft 25. The shaft 28 carries a gear 29. The gear 26 meshes with a gear 30 fixed to the shaft 14. Another gear 31, also fixed to the shaft 14, meshes with an idler 32 which is rotatable upon a stub shaft 33 extending inwardly from the end wall of the gear carrier (see Fig. 3). This idler 32 also meshes with gear 29. Hence power is transmitted from shaft 22 and shaft 25 through gears 26 and 30 to shaft 14, and from shaft 14 through gears 31, 32 and 29 to shaft 28, and thence to shaft 23. Now when the operator withdraws the female clutch members 24 and rotates the gear carrier 17 through 180°, the shaft 34 extending continuously through the carrier is brought into alignment with the shafts 22 and 23, and when the clutches are again engaged, direct drive is transmitted from the shaft 22 to the shaft 23.

In Fig. 2 I have shown the second speed position of the mechanism. Here a shaft 35 is connected with the shaft 22 by the coupling members. The shaft 35 carries a gear 36. The inner end of the shaft is bored out to rotatably receive the constricted end 37 of a shaft 38 which carries a gear 39. The gears 36 and 39 mesh, respectively, with the gears 40 and 41 formed upon a common hub. Within this hub is a bushing 42 surrounding the shaft 14, and upon which the gears 40 and 41 rotate. In this position of the device, power is transmitted from the shaft 22 through shaft 35 and gear 36 to gears 40 and 41, and thence back through gear 39 to shaft 38 and driven shaft 23.

Now if the carrier 17 were to be rotated through 180° from the position of Fig. 2, the transmission would be brought into first speed position, aligned shafts 43 and 44 being caused to engage through their cone elements 24 with the clutch elements 24 of the driving and driven shafts 22 and 23. Upon the shaft 43 is fixed a gear 45 which is constantly in mesh with the gear 30. The shaft 44 carries a gear 46 which meshes with the gear 31 on the jack shaft. Shaft 43 is provided with a center bore and a bushing to receive the constricted end of shaft 44 in order that the two shafts may be independently rotatable. The drive for this speed comes from shaft 22 through shaft 43 and gears 45 and 30 to the jack shaft 14, and thence through gears 31 and 46 to the shaft 44 and the driven shaft 23.

It will be noted that when the reverse gear is in operation the shafts 43 and 44 are rotated idly, while in first speed position the shafts 25 and 28 are driven idly. In second speed no gears turn except the gears 36, 40, 41 and 39 which are required for the transmission of power at this speed. While it is considered an advantage to mount the gears 40, 41 to rotate upon the shaft 14, and thereby enable the second speed gears to remain motionless while the transmission is in first speed or reverse speed, and also to enable the first speed and reverse speed gears to remain motionless while the transmission is in the second speed, the construction can obviously be simplified somewhat by securing gears 40 and 41 to the shaft 14, in which event all of the gears rotate for all speeds other than high speed or direct drive.

Figure 4:
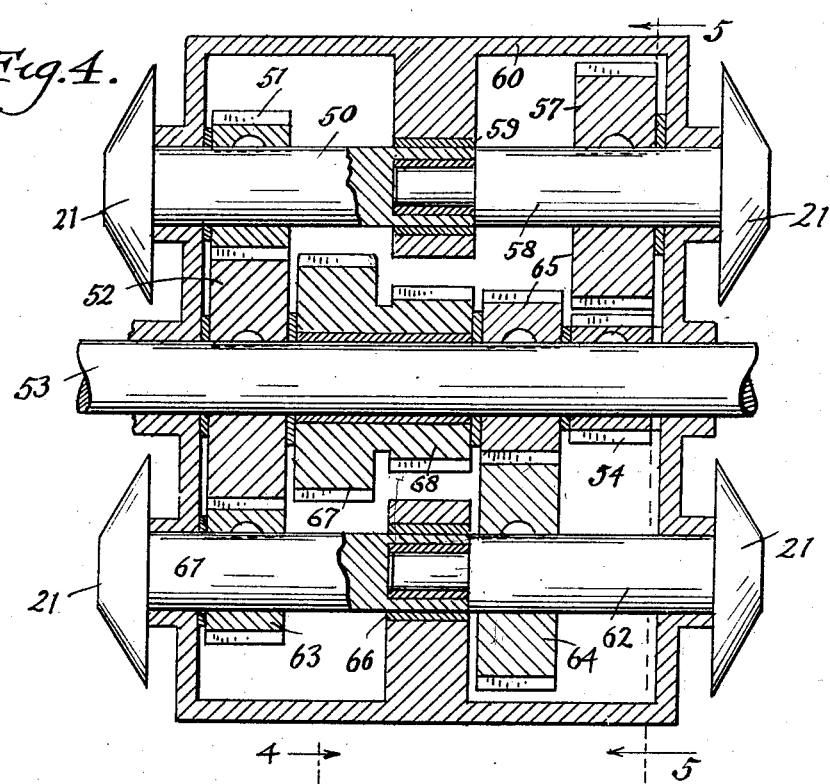
Fig. 4 is another sectional view illustrating a modification of the invention, the section being taken substantially on the line 4—4 of Fig. 5.
Figure 5:
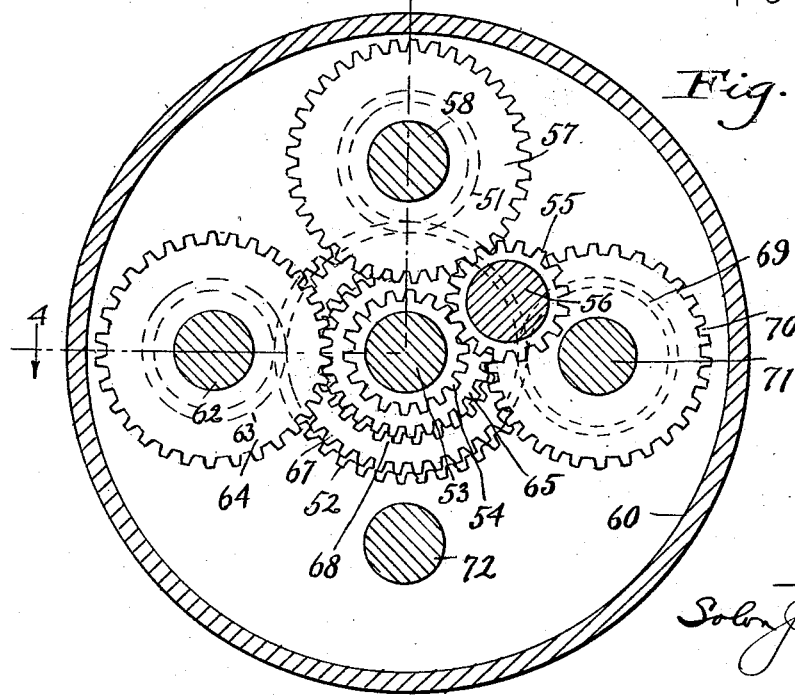
Fig. 5 is a transverse sectional view of the same structure taken substantially on the line 5—5 of Fig. 4.

In Figs. 4 and 5 I have illustrated a modification, wherein the speed for reverse drive may be designed for a lower ratio than that employed in first speed forward. In the upper part of Fig. 4 the transmission is shown in reverse drive position, the shaft 50 being presumed to be coupled with the driving shaft 22, and carrying a gear 51 which meshes with the gear 52 on the jack shaft 53, the latter corresponding with the shaft 14 in the previously described form of the invention. A small gear 54 at the opposite end of the shaft 53 meshes with an idler 55 mounted on a stub shaft 56 (see Fig. 5), the latter gear meshing in turn, with a gear 57 on a shaft 58 which is adapted to be coupled with the driven shaft 23. The inner ends of the shafts 50 and 58 are shown interconnected for relative rotation, and are supported in a bushing 29 carried by an internal projection or boss on the carrier 60.

In the lower part of Fig. 4 are shown the first speed connections. They are brought into alignment with the driving and driven shafts 22 and 23 by rotation of the casing 60 through an angle of 90°, at which time the shaft 61 may be coupled to the driving shaft 22 and the shaft 62 coupled to the driven shaft 23. The shaft 61 carries a gear 63 which meshes with the gear 52, while the shaft 62 carries a gear 64 that meshes with the gear 65 secured to shaft 53. The shafts 61 and 62, like the shafts 50 and 58, are interconnected for relative rotation, and are mounted in a bushing 66 supported by a projection formed integral with the inner side of the carrier 60. The operation is the same as in the corresponding cases in the first described modification.

Second speed drive is obtained in the same manner as disclosed in Fig. 2 through gears 67 and 68 which are rotatable together upon the jack shaft 53 and mesh with gears 69 and 70, respectively, the latter being fixed upon a shaft 71 and the former upon a shaft in alignment therewith but rotatable independently thereof.

Direct drive is obtained by coupling to the shafts 22 and 23 a shaft 72 which extends through the casing 60 and is provided at its ends with coupling members 21 precisely as in the case of the shaft 34.

While in the foregoing description and in the accompanying drawings I have disclosed the invention more or less in detail, I desire it to be understood that such detail disclosure is primarily for the purpose of fully illustrating the invention and is not to be construed as amounting to a limitation upon the scope thereof.

Having thus described my invention, I claim:

1. In combination, a gear carrier, a shaft around which said carrier is mounted, a plurality of transmission units mounted in said carrier, each unit comprising a pair of aligned coupling portions positioned at same distance from the said shaft, two of said units comprising gears supported upon and concentrically arranged with respect to said shaft and other gears operatively associated with the corresponding coupling portions, whereby any of said pairs of coupling portions may be brought into a common power transmitting position by the rotational adjustment of the carrier around the axis of said shaft.

2. In combination, a gear carrier, a shaft around which said carrier is mounted, a plurality of transmission units mounted in said carrier, each unit comprising a pair of aligned coupling portions positioned at the same distance from the said shaft, two of said units comprising gears supported upon and concentrically arranged with respect to said shaft and other gears operatively associated with the corresponding coupling portions, the gears of one of said units being independently rotatable with respect to those of another unit, whereby any of said pairs of coupling portions may be brought into a common power transmitting position by the rotational adjustment of the carrier around the axis of said shaft.

3. In combination, a gear carrier, a shaft around which said carrier is rotively mounted, a plurality of transmission units mounted in said carrier, each unit comprising a gear train and also comprising a pair of aligned coupling portions, all of said coupling portions being positioned at the same distance from said shaft, said shaft constituting the jack shaft for each of said gear trains, whereby any one of said gear trains may be brought selectively into a common power transmitting position by the rotational adjustment of the carrier around the axis of said shaft.

4. In combination, a gear carrier, a shaft around which said carrier is mounted to rotate, a plurality of transmission units mounted in said carrier, each unit comprising a pair of aligned coupling portions, all of said coupling portions being positioned at the same distance from said shaft and gears operatively associated therewith and with the corresponding coupling portions, one of said units comprising gears fixed upon said shaft and gears operatively associated therewith and with the corresponding coupling portions, another of said units comprising gears mounted to rotate together upon said shaft, whereby any of said pairs of coupling portions may be brought into a common power transmitting position by the rotational adjustment of the carrier upon the shaft.

5. In combination, a gear carrier, a shaft around which said carrier is mounted, a plurality of transmission units mounted in said carrier, each unit comprising a pair of aligned coupling portions positioned at the same distance from the said shaft, two of said units each having a gear train comprising a pair of gears rotating together supported upon and concentrically arranged with respect to said shaft each train being operatively associated with a pair of said coupling portions whereby any of said pairs of coupling portions may be brought into a common power transmitting position by the rotational adjustment of the carrier around the axis of said shaft.

6. In combination, aligned driving and driven shafts, a gear carrier, a third shaft parallel to said driving and driven shafts around which said carrier is rotatably mounted, a plurality of transmission units, each unit having a gear train adapted to transmit motion from said driving shaft to said driven shaft, each of said gear trains comprising a gear mounted in said carrier adapted to be brought into alignment with said driving and driven shafts and comprising also gears mounted upon said third shaft.

In testimony whereof, I hereunto affix my signature.

SOLON J. BOUGHTON.